United States Patent
Cao et al.

(10) Patent No.: US 7,089,029 B2
(45) Date of Patent: Aug. 8, 2006

(54) ADJUSTING THE TRANSMISSION POWER OF A FORWARD ACCESS CHANNEL (FACH), AND A CORRESPONDING NETWORK FOR MOBILE TELECOMMUNICATIONS

(75) Inventors: Qiang Cao, Swindon (GB); Patrick Georges Venceslas Charriere, Tetbury (GB); Seau Sian Lim, Swindon (GB); Philip Charles Sapiano, Corsham (GB)

(73) Assignee: Lucent Technologies Inc., Murray Hill, NJ (US)

( * ) Notice: Subject to any disclaimer, the term of this patent is extended or adjusted under 35 U.S.C. 154(b) by 421 days.

(21) Appl. No.: 10/457,140

(22) Filed: Jun. 9, 2003

(65) Prior Publication Data
US 2004/0248605 A1    Dec. 9, 2004

(51) Int. Cl.
*H04Q 7/20* (2006.01)
(52) U.S. Cl. .................... 455/522; 455/69; 455/442
(58) Field of Classification Search ............... 455/522, 455/69, 442, 436, 437, 67.11, 524, 525
See application file for complete search history.

(56) References Cited

U.S. PATENT DOCUMENTS 6,154,659 A * 11/2000 Jalali et al. ................. 455/522

2002/0094833 A1 * 7/2002 Lieshout et al. ............ 455/522

FOREIGN PATENT DOCUMENTS

EP    1 065 800    3/2001
EP    1 143 635    10/2001

OTHER PUBLICATIONS

3rd Generation Partnership Project: "Technical Specification Group Radio Access Network Radio Resource Control (RRC) Protocol Specification, (Release 5)," (Mar. 2003), Retrieved from the Internet: URL: www.3qpp.org, (Retrvl. Date Sep. 24, 2004), whole document.
European Search Report.

* cited by examiner

*Primary Examiner*—Matthew D. Anderson
*Assistant Examiner*—Philip J. Sobutka

(57) ABSTRACT

The transmission power is adjusted of a Forward Access Channel (FACH) from a base station to a mobile user terminal in a network for mobile telecommunications. The method comprises steps as follows. The base station sends a signal at a first transmission power level to the mobile user terminal. The mobile user terminal then sends a report of one or more parameter values dependent upon measured signal quality provided a predetermined reporting criterion is met. The base station then adjusts its transmission power to the mobile user terminal in consequence so as to maintain the measured signal quality within acceptable limits.

24 Claims, 4 Drawing Sheets

ADJUSTING THE TRANSMISSION POWER OF A FORWARD ACCESS CHANNEL (FACH), AND A CORRESPONDING NETWORK FOR MOBILE TELECOMMUNICATIONS

TECHNICAL FIELD

The present invention relates to transmission power of a Forward Access Channel (FACH) in a network for mobile telecommunications. The present invention also relates to a network for mobile telecommunications.

BACKGROUND OF THE INVENTION

As part of radio resource management, a mobile user terminal (user equipment, UE) is moved from one resource state to another in order to maximise the efficiency of the available radio resources (e.g. power, bandwidth). The Universal Mobile Telecommunications System (UMTS) standard requires each mobile user terminal to take either of two states for active data transmission, namely cell forward access channel (Cell-FACH) state and cell dedicated channel (Cell-DCH) state, (see for example Third Generation Partnership Project (3GPP) Technical Specification 25.331).

In Cell-FACH state, a shared channel, specifically the forward access channel (FACH), is used shared between a group of mobile user terminals and having no associated dedicated physical control channel. The forward access channel (FACH) is used for low volume data and is similar to the broadcast channel and random access channel of older mobile technologies. It may typically be used e.g. for the viewing time after a Web page download. Use of the forward access channel (FACH) gives improved cell capacity at low data rates and thus improves the battery life of the mobile user terminal due to the lower transmission power that is required.

On the other hand, Cell-DCH state uses a dedicated channel (DCH) to a mobile user terminal which has a dedicated physical control channel, including transmit power control information and pilot information, continuously transmitted. A dedicated channel (DCH) of a cell is typically used for high volume data or voice.

Whilst in Cell-DCH state, the mobile user terminal reports to the base station when criteria are met such as when the measured signal from a monitored base station goes above or below a threshold, whereupon the base station may choose to add or remove a soft handover leg (i.e soft handover connection, also known as soft handoff connection).

The standards provide a variety of measurement reporting methods for reporting handover measurements (3GPP Technical Specification 25.331 Section 14.1.2), but whilst the mobile user terminal is in Cell-FACH state, measurements on received signals are disabled as they might result in frequent measurement reports back to the base station thereby reducing the capacity of the channel for user data or voice.

Furthermore, the standards provide no reliable means for determining the transmit power at which each Forward Access Channel (FACH) frame should be broadcast to the mobile user terminal (UE), so the FACH channel is always broadcast at a high power sufficient to cover the whole cell.

Furthermore, as regards criteria for transiting between Cell-FACH state and Cell-DCH state, a known criterion is level of occupancy of the buffer (in the mobile user terminal) which stores data to be sent. A buffer occupancy measurement is passed from the mobile user terminal to the base station where a decision to instruct a change of state is made.

As further background, Dynamic Bearer Control (DBC) is a commonly understood mechanism defined within the 3GPP standards which determines whether, and to what extent, to grant resources, i.e to allocate a data rate, based upon the estimated power consumption. The DBC functional block usually receives no power information or soft handover information. Accordingly, the DBC functional block assumes that a mobile user terminal requires maximum power when transiting into a Cell-DCH state so may allocate a lower data rate than it needs to, or even refuse to provide DCH resources.

When the base station decides that the mobile user terminal in the Cell-FACH state should transition to Cell-DCH state, it must do so without any soft handover legs i.e. without second or further radio connections between the mobile user terminal and other cells than the primary one. This is because there are no soft handover connections to mobile user terminals in the Cell-FACH state. Also the base station and mobile user terminal must start with a high initial transmit power in order to ensure a rapid synchronisation between the mobile user terminal and the base station. These result in a reduction in the traffic capacity, particularly in cases where the transitions between the two states are frequent.

SUMMARY OF THE INVENTION

An example of the present invention is a method of adjusting the transmission power of a Forward Access Channel (FACH) from a base station to a mobile user terminal in a network for mobile telecommunications. The method comprises steps as follows. The base station sends a signal at a first transmission power level to the mobile user terminal. The mobile user terminal then sends a report of one or more parameter values dependent upon measured signal quality provided a predetermined reporting criterion is met. The base station then adjusts its transmission power to the mobile user terminal in consequence so as to maintain the measured signal quality within acceptable limits.

A feedback mechanism is thus provided to adjust the power of a transmission to a mobile user terminal in Cell-FACH state. This results in more efficient power allocation and hence improved traffic capacity.

The predetermined reporting criterion can be that the change in measured signal quality from the measured signal quality of the last report is greater than a predetermined amount. If this criteria is met the transmission power is adjusted in consequence. In some embodiments, a means is thus provided for sending back measurement information at an appropriately low rate to the base station as otherwise, in some circumstances, power control on the FACH channel would significantly increase traffic. Slow power control of the FACH channel is thus provided (slow in the sense of being occasional feedback, rather than the continuous feedback as occurs in a dedicated channel).

When the mobile user terminal transits from a Cell-FACH state to a Cell-DCH state, the initial transmission power to the mobile user terminal in the Cell-DCH state can be set dependent upon the last adjusted transmission power level in the preceding Cell-FACH state. Thus a more accurate initial transmit power level is provided, which is specific to the mobile user terminal, when being transitioned by the base station from Cell-FACH state to Cell-DCH state. In some embodiments, transiting between states happens at a frequent rate so efficient power allocation (whilst maintaining rapid synchronisation between mobile user terminal and base station during state transitions) is particularly beneficial.

Transition to the Cell-DCH state preferably occurs dependent upon transmission power in the Cell-FACH state being lower than a predetermined limit. The measurement reports thus provide additional information usable as a factor in determining when to transit between Cell-DCH and Cell-FACH states. In particular the measured SIR of the received signal, for example, can be used as a factor in deciding when to transit from Cell-FACH state, for example to Cell-DCH state.

The present invention also provides a network for mobile telecommunications. An example comprises a base station and a mobile user terminal. The base station is operative to send a signal at a first transmission power level to the mobile user terminal on a Forward Access Channel (FACH). The mobile user terminal is operative to send a report of one or more parameter values dependent upon measured signal quality upon a predetermined reporting criterion being met. The base station is then operative to adjust its transmission power to the mobile user terminal in consequence so as to maintain the measured signal quality within acceptable limits.

BRIEF DESCRIPTION OF THE DRAWINGS

A preferred embodiment of the present invention will now be described by way of example and with reference to the drawings, in which.

DETAILED DESCRIPTION

Figure 1:
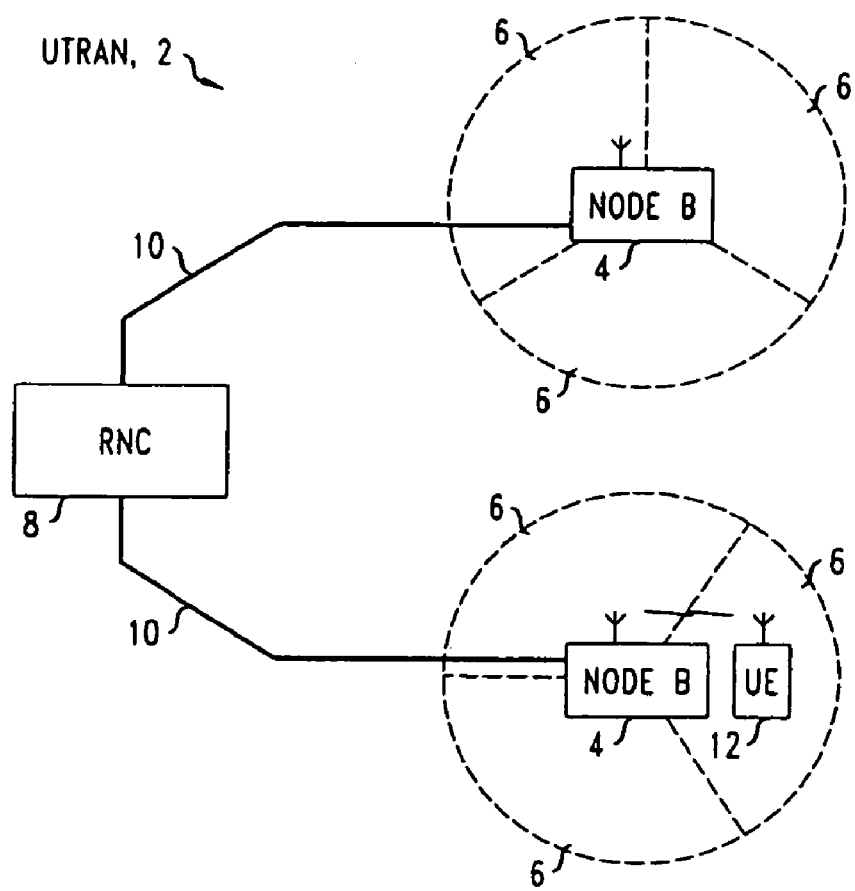
FIG. 1 is a diagram illustrating a UTRAN network and a mobile user terminal.
Figure 2:
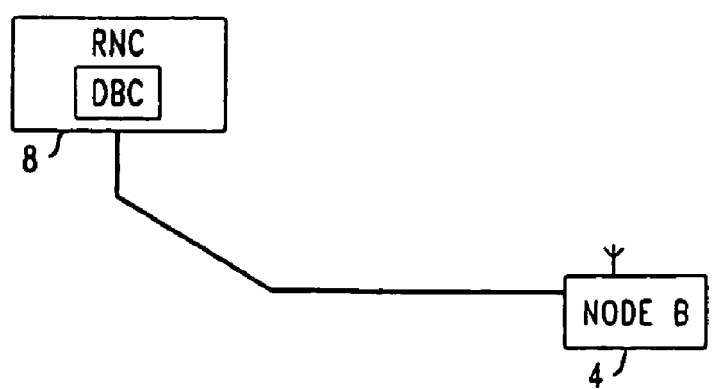
FIG. 2 is a diagram illustrating a radio network controller and a base station.

The preferred network is a Universal Mobile Telecommunications System (UMTS) terrestrial access network (UTRAN), which is a type of wideband code division multiple access (CDMA) network for mobile telecommunications. The UTRAN network is basically as shown in FIG. 1. Only one radio network controller and two base stations of the UTRAN network 2 are shown for simplicity. As shown in this Figure, the UTRAN network 2 includes base stations 4. Each base station (Node B in UMTS terminology) 4 typically has three cells 6 (i.e. radio coverage areas, also known as sectors) as the base station 4 typically has three directional antennas (not shown) angled at 120 degrees to each other in azimuth. Radio network controllers (RNC) 8 which are themselves connected to the rest of the telecommunications "world" (not shown) each control several base stations 4 and hence a number of cells 6. A base station 4 is connected to its controlling radio network controller (RNC) 8 via a respective interface 10 known as an IuB interface. In use, a mobile user terminal 12 (often referred to as User Equipment (UE) in UMTS terminology) communicates with a serving radio network controller (RNC) 8 via at least one cell 6 of at least one base station 4 (i.e. communicates with the UTRAN network 2). As shown in FIG. 2, the RNC 8 includes a Dynamic Bearer Control (DBC) block as will be described later.

Example Processes

Figure 3:
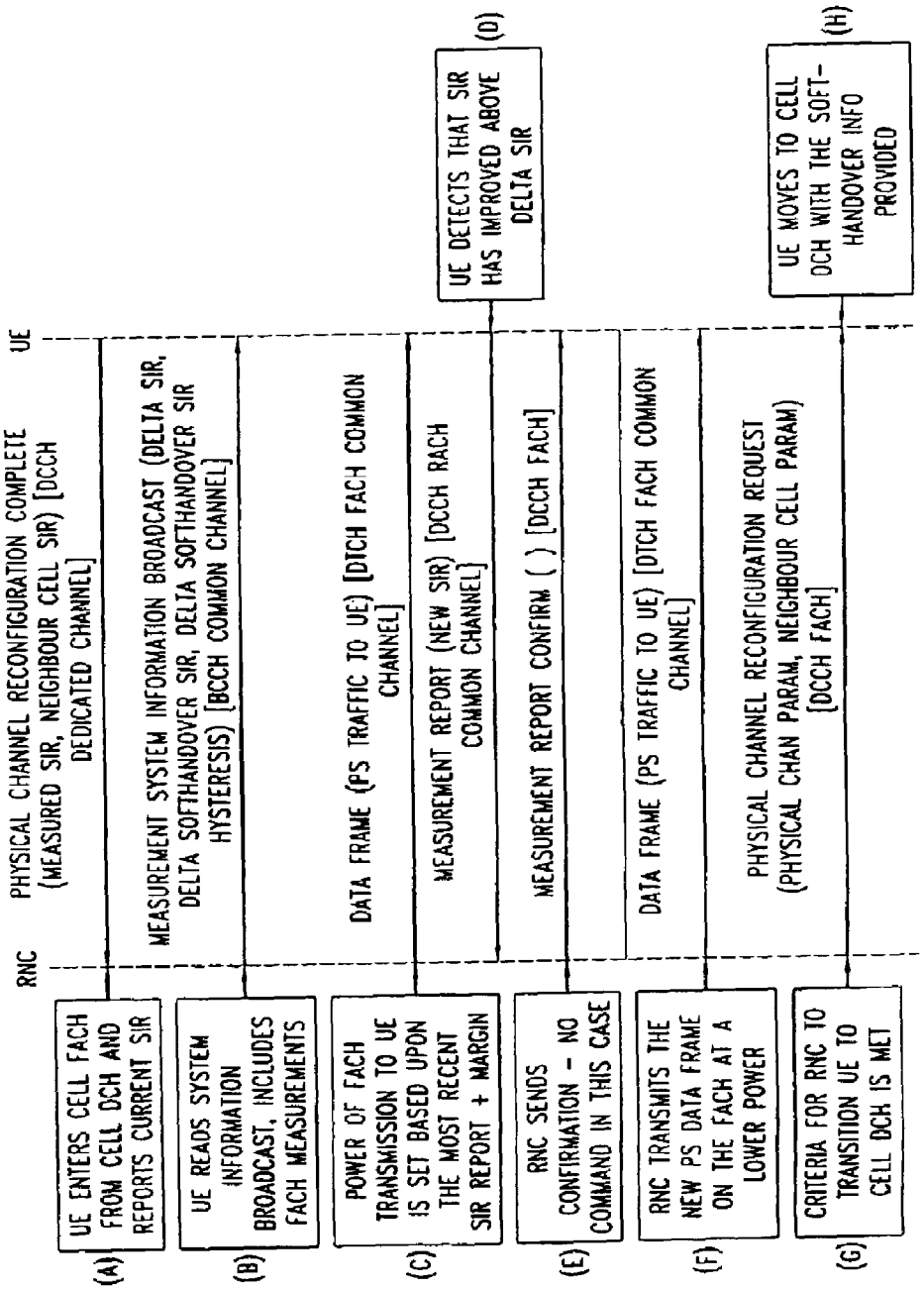
FIG. 3 is a diagram illustrating an example messaging sequence.

FIG. 3 shows a mobile user terminal entering Cell-FACH state (denoted steps a,b in FIG. 3), receiving data (c), detecting that the received signal to interference ratio (SIR) of the serving cell has improved and so triggering a measurement report (d,e), and receiving subsequent data at lower power (f). It also shown transiting to Cell-DCH state (g,h).

Figure 4:
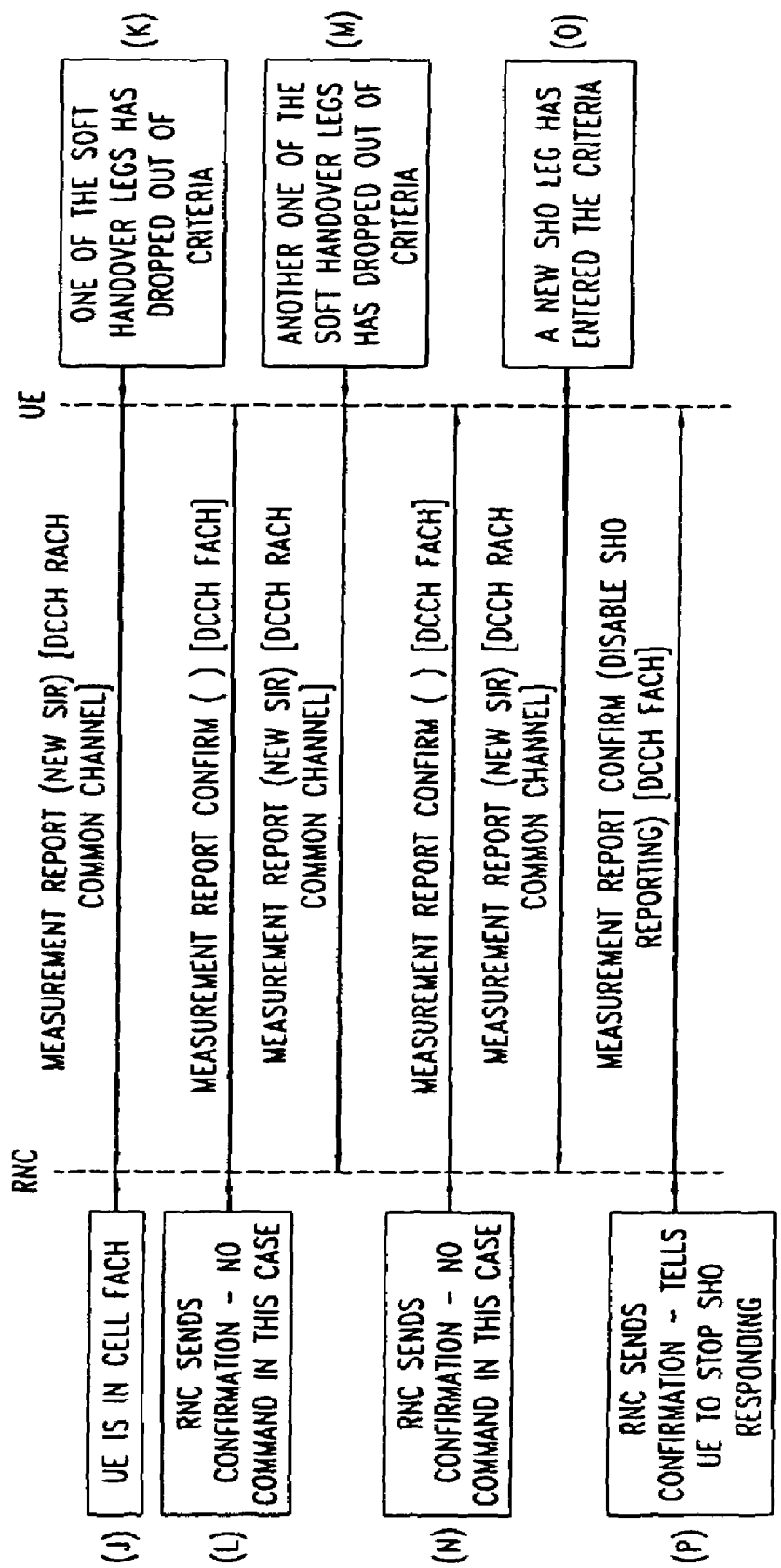
FIG. 4 is a diagram illustrating a further example messaging sequence.

FIG. 4 shows a mobile user terminal in Cell-FACH state (j), a neighbour cell having previously been reported as satisfying soft-handover criteria, the neighbour cell no longer meeting the criteria and so sending a measurement report (k), this being received and confirmed (l) by the base station. It also shows a further neighbour now meeting the criteria (m) and so acting similarly. It also shows a further neighbour no longer meeting the criteria (o) and sending a measurement report accordingly. In this case, the RNC decides the measurement reporting is too frequent and so disables (p) the measurement reporting.

Underlying Process

The general process underlying the FIG. 3 and FIG. 4 examples is as described in the seven numbered steps as follows.

(1) On entering Cell-FACH state, the mobile user terminal takes measurements of the Serving Cell received quality (Pilot Channel Signal to interference ratio) and sends this back to the base station along with measurements of the same parameter of the neighbouring cells (denoted (a) in FIG. 3). When transiting from Cell-FACH state to Cell-DCH state, the base station, of course, needs to transmit at an initial output power which will be reliably received by the mobile user terminal and preferably on the most significant handover legs.

(2) The System Information Broadcast (SIB) channel is read by all mobile user terminals when they enter Cell-FACH state before they are able to start transmission (a in FIG. 3). From this channel, a new set of measurement reporting criteria are broadcast to the mobile user terminal (b in FIG. 3).

The measurement reporting criteria are Delta SIR, Delta Soft Handover SIR, and Delta Soft Handover SIR Hysteresis being sufficiently large. Delta SIR indicates the absolute difference between the current Measured Signal to Interference Ratio and the last reported SIR to the Base station before a new report must be generated. Delta Soft Handover SIR indicates the difference in SIR between the serving cell and best neighbour SIR before a new report is generated. Delta Soft Handover SIR Hysteresis indicates the required hysteresis on that for reporting addition of the best neighbour or removal of the best neighbour from being considered for handover connection. The FIG. 3 example shows the criteria for the best neighbour cell, but can easily be extended to seek multiple best neighbour cells.

Figure 5:
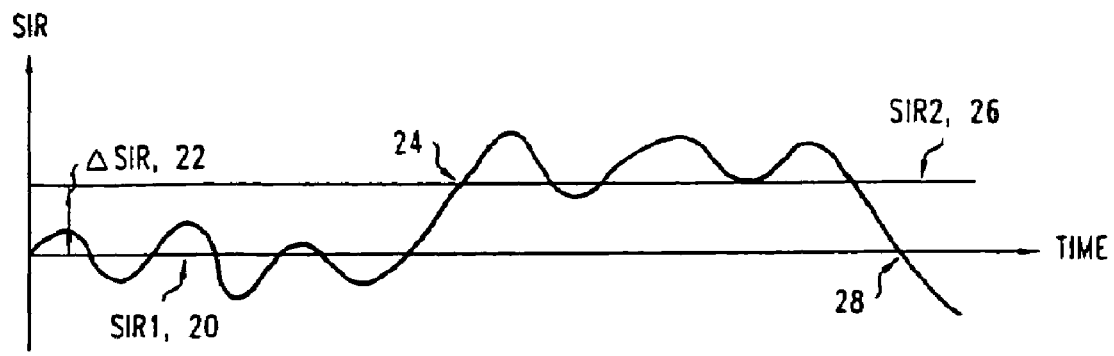
FIG. 5 is a diagram illustrating an example of how SIR changes over time.
Figure 6:
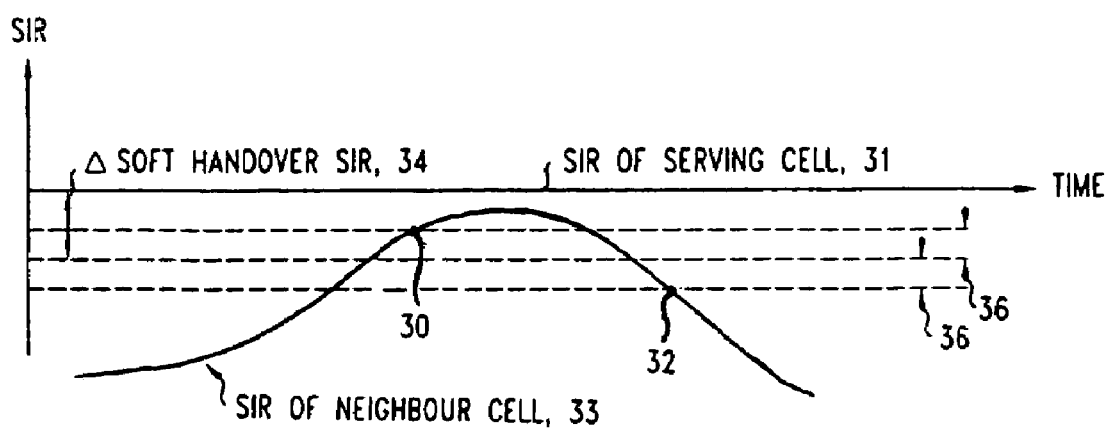
FIG. 6 is a diagram illustrating an example of how soft handover SIR changes over time.

(3) When the mobile user terminal detects that at least one of the criteria have been satisfied for a report, it sends a measurement report (d in FIG. 3, k in FIG. 4) on an unacknowledged mode transmission to the base station. The criteria are:

i) The Serving cell Pilot SIR has changed by more than Delta SIR since the last reported measurement, as shown in FIG. 5. FIG. 5 shows SIR against time. A first reference level 20 is the measured SIR value SIR1 sent in the last measurement report. A change in SIR of more than DeltaSIR 22 triggers a further measurement report 24 which reports an SIR value SIR2. Also a new reference level 26 is then set of SIR2 being SIR1+DeltaSIR. As shown in FIG. 5, when the measured SIR deviates from the reference level 26 by more than DeltaSIR, a further measurement report is triggered 28.

ii) The difference in between the serving cell SIR 31 and best neighbour cell SIR 33 is greater than Delta Soft Handover SIR (denoted 34 in FIG. 6)+Delta Soft Handover SIR Hysteresis (denoted 36 in FIG. 6), as shown by reference numeral 32 in FIG. 6, the best neighbour SIR 33 being lower than the serving cell SIR 31. The measurement report generated indicates removal of a soft handover leg for use in Cell-DCH state.

iii) The difference between the best neighbour cell 33 and the serving cell SIR 31 has gone to less than Delta Soft Handover SIR (denoted 34 in FIG. 6)−Delta Soft Handover SIR Hysteresis (denoted 36 in FIG. 6), as shown by reference numeral 30 in FIG. 6, the best neighbour SIR 33 being lower than the serving SIR 31. The measurement report generated indicates inclusion of a new soft handover leg for use in Cell-DCH state.

(4) The base station responds with a measurement response message to the mobile user terminal (e in FIG. 3, l n in FIG. 4). The measurement response message has the following purposes:

i) The response is transmitted at the new power level, and if the mobile user terminal receives the response correctly, the mobile user terminal will not repeat the measurement report message transmission.

ii) The mobile user terminal gets an acknowledgement of measurement report message reception from the base station which means that retransmission is unnecessary.

iii) The message acknowledging receipt of the measurement report by the base station has some optional information elements which may be used to configure the time between reports to a longer interval. Such an option is most useful for mobile user terminals which are of high mobility, and so are generating frequent reports and hence a large amount of interference (p in FIG. 4).

The optional elements may also be extended to reconfigure other aspects of the measurement criteria, e.g. to increase hysteresis.

(5) The Base Station uses the most recent report of Serving Cell Pilot SIR (and optionally neighbour cell SIR) to determine the transmit power of a FACH frame to a mobile user terminal (c,e,f,g in FIG. 3, l,p in FIG. 4).

(6) In determining the criteria for transiting from Cell-FACH state to Cell-DCH state, the base station takes into account an estimate of the required mobile user terminal transmit power based upon the latest report of serving Cell SIR (g in FIG. 3). Basically, the higher the SIR and hence the lower the power estimate is, the less likely is the transition to the DCH state.

(7) When the mobile user terminal transits from Cell-FACH state to Cell-DCH state, the base station sets up the transmissions as follows based upon the last-received report:

a) Perform Dynamic Bearer Control (DBC) based upon the information from the last-received report. The DBC block is in the radio network controller (RNC) controlling the base station as shown in FIG. 2 and determines whether and to what extent to grant resources, i.e to allocate a data rate, based upon the estimated power consumption.

b) If the last-received report indicated a neighbour cell meeting the defined criteria then set up a soft handover leg to the neighbour cell as well as the serving cell.

c) Start the initial downlink transmit power based upon the last reported serving cell pilot SIR.

The reader will note that in the preferred embodiment described above, SIR is the measure of signal quality which is used. In other embodiments, other measures of signal quality are used instead, such as bit error rate, received signal strength, or error vector magnitude.

| Abbreviations | |
| --- | --- |
| 3GPP | Third Generation Partnership Project |
| DBC | Dynamic Bearer Control |
| DCH | Dedicated channel |
| FACH | Forward access channel |
| RNC | Radio network controller |
| SIR | Signal to interference ratio |
| UE | User Equipment, i.e. mobile user terminal |
| UMTS | Universal Mobile Telecommunications System |
| UTRAN | UMTS terrestrial radio access network |

The invention claimed is:

1. A method in a network for mobile telecommunications of adjusting the transmission power of a Forward Access Channel (FACH) from a base station to a mobile user terminal, comprising the steps of:

sending by the base station a signal at a first transmission power level to the mobile user terminal, and adjusting by the base station its transmission power to the mobile user terminal, after receiving from the mobile user terminal a report of one or more parameter values dependent upon measured signal quality upon a predetermined reporting criterion being met, so as to maintain the measured signal quality within acceptable limits, wherein upon the mobile user terminal transiting from a Cell-FACH state to a Cell-DCH state, the initial transmission power to the mobile user terminal in the Cell-DCH state is dependent upon the last adjusted transmission power level in the preceding Cell-FACH state.

2. A method according to claim 1, in which the predetermined reporting criterion is that the change in measured signal quality from the measured signal quality of the last report is greater than a predetermined amount whereupon the transmission power is adjusted in consequence.

3. A method according to claim 1, in which transition to the Cell-DCH state occurs dependent upon transmission power in the Cell-FACH state being lower than a predetermined limit.

4. A method according to claim 1, comprising the step of, if a soft handover connection is set up, setting up the connection with an initial transmission power from the base station which is mobile user terminal specific.

5. A method according to claim 1, comprising the step of using the last received parameter values to determine whether a soft handover connection is to be set up when transiting from Cell-FACH to Cell-DCH state.

6. A method according to claim 1, comprising the step of allocating by a dynamic bearer controller in the base station a data rate for Cell-DCH state dependent upon the last received parameter values from the mobile user terminal.

7. A method according to claim 1, comprising the step of, when the measured signal quality from the best neighbour cell is less than the measured signal quality from the serving cell by more than a first predetermined amount when the mobile user terminal is in a soft handover region but in Cell-FACH state, removing the best neighbour from a list of cells for soft handover connection in the Cell-DCH state.

8. A method according to claim 1, comprising the step of, when the measured signal quality from the best neighbour cell is less than the measured signal quality from the serving cell by less than a first predetermined amount when the mobile user terminal is in a soft handover region but in Cell-FACH state, adding the best neighbour to a list of cells for connection in the Cell-DCH state.

9. A method according to claim 1, comprising the step of taking the adjusted power level as the transmission power level to be used initially in soft handover connection to a neighbouring cell upon the soft handover connection being established.

10. A method according to claim 1, in which the network is a code division multiple access network at least substantially in accordance with a Third Generation Partnership Project standard.

11. A method according to claim 1, in which the measured signal quality is signal to interference ratio (SIR).

12. A network for mobile telecommunications comprising a base station being operative to send a signal at a first transmission power level to a mobile user terminal on a Forward Access Channel (FACH), to receive a report from the mobile user terminal of one or more parameter values dependent upon measured signal quality upon a predetermined reporting criterion being met, and to adjust its transmission power to the mobile user terminal in consequence so as to maintain the measured signal quality within acceptable limits, wherein upon the mobile user terminal being operative to transit from a Cell-FACH state to a Cell-DCH state, the initial transmission power to the mobile user terminal in the Cell-DCH state is dependent upon the last adjusted level of transmission power to the mobile user terminal in the preceding Cell-FACH state.

13. A network according to claim 12, in which the predetermined reporting criterion is that the change in measured signal quality from the measured signal quality of the last report is greater than a predetermined amount whereupon the base station adjusts its transmission power in consequence.

14. A network according to claim 1, in which transition of the mobile user terminal to the Cell-DCH state occurs dependent upon transmission power to the mobile terminal in the Cell-FACH state being lower than a predetermined limit.

15. A network according to claim 1, in which if a soft handover connection is set up, the connection is set up with an initial transmission power from the base station which is mobile user terminal specific.

16. A network according to claim 1, in which the last received parameter values are used to determine whether a soft handover connection is to be set up when the mobile user terminal transits from Cell-FACH to Cell-DCH state.

17. A network according to claim 1, in which a dynamic bearer controller in the base station is operative to allocate a data rate for the mobile user terminal in Cell-DCH state dependent upon the last received parameter values from the mobile user terminal.

18. A network according to claim 12, in which the predetermined reporting criterion is such that when the measured signal quality from the best neighbour cell is less than the measured signal quality from the serving cell by more than a first predetermined amount when the mobile user terminal is in a soft handover region but in Cell-FACH state, the best neighbour is removed from a list of cells for soft handover connection in the Cell-DCH state.

19. A network according to claim 12, in which the predetermined reporting criterion is such that when the measured signal quality from the best neighbour cell is less than the measured signal quality from the serving cell by less than a first predetermined amount when the mobile user terminal is in a soft handover region but in Cell-FACH state, the best neighbour is added to a list of cells for connection in the Cell-DCH state.

20. A network according to claim 12, in which the adjusted level of power from the base station is taken as the transmission power level to be used initially in soft handover connection to a neighbouring cell upon the soft handover connection being established.

21. A network according to claim 12, in which the network is a code division multiple access network at least substantially in accordance with a Third Generation Partnership Project standard.

22. A network according to claim 12, in which the measured signal quality is signal to interference ratio (SIR).

23. A method for mobile telecommunications of adjusting the transmission power of a Forward Access Channel (FACH) from a base station to a mobile user terminal, comprising the steps of:
  receiving by the mobile user terminal a signal at a first transmission power level from the base station, and
  sending a report of one or more parameter values dependent upon measured signal quality upon a predetermined reporting criterion being met, wherein upon the mobile user terminal transiting from a Cell-FACH state to a Cell-DCH state, the initial transmission power to the mobile user terminal in the Cell-DCH state is dependent upon the last adjusted transmission power level in the preceding Cell-FACH state.

24. A mobile user terminal operative to receive a signal at a first transmission power level from a base station on a Forward Access Channel (FACH) and to send a report from the mobile user terminal of one or more parameter values dependent upon measured signal quality upon a predetermined reporting criterion being met, wherein upon the mobile user terminal being operative to transit from a Cell-FACH state to a Cell-DCH state, the initial transmission power to the mobile user terminal in the Cell-DCH state is dependent upon the last adjusted level of transmission power to the mobile user terminal in the preceding Cell-FACH state.

* * * * *